(12) United States Patent
Kim et al.

(10) Patent No.: US 10,558,885 B2
(45) Date of Patent: Feb. 11, 2020

(54) DETERMINATION METHOD AND RECORDING MEDIUM

(71) Applicant: Panasonic Intellectual Property Management Co., Ltd., Osaka (JP)

(72) Inventors: Min Young Kim, San Jose, CA (US); Luca Rigazio, Campbell, CA (US); Sotaro Tsukizawa, Osaka (JP); Kazuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 375 days.

(21) Appl. No.: 15/485,250

(22) Filed: Apr. 12, 2017

(65) Prior Publication Data

US 2017/0220891 A1 Aug. 3, 2017

Related U.S. Application Data

(63) Continuation of application No. PCT/JP2016/000462, filed on Jan. 29, 2016.
(Continued)

(30) Foreign Application Priority Data

Jan. 15, 2016 (JP) .................. 2016-006580

(51) Int. Cl.
*G06K 9/46* (2006.01)
*G06K 9/62* (2006.01)
(Continued)

(52) U.S. Cl.
CPC ......... *G06K 9/4628* (2013.01); *G06K 9/6223* (2013.01); *G06K 9/6255* (2013.01);
(Continued)

(58) Field of Classification Search
CPC .. G06K 9/4628; G06K 9/6223; G06K 9/6255; G06K 9/6256; G06K 9/66;
(Continued)

(56) References Cited

U.S. PATENT DOCUMENTS 5,774,633 A * 6/1998 Baba .................... G05B 13/027
706/25
7,386,165 B2 * 6/2008 Dundar ................ G06K 9/6256
382/128
(Continued)

FOREIGN PATENT DOCUMENTS

JP 2005-044330 2/2005

OTHER PUBLICATIONS

Denton, Emily L., et al. "Exploiting linear structure within convolutional networks for efficient evaluation." Advances in neural information processing systems. 2014. 12 pages (Year: 2014).*
(Continued)

*Primary Examiner* — Manav Seth
(74) *Attorney, Agent, or Firm* — Greenblum & Bernstein, P.L.C.

(57) ABSTRACT

A determination method for determining the structure of a convolutional neural network includes acquiring N filters having the weights trained using a training image group as the initial values, where N is a natural number greater than or equal to 1, and increasing the number of the filters from N to M, where M is a natural number greater than or equal to 2 and is greater than N, by adding a filter obtained by performing a transformation used in image processing fields on at least one of the N filters.

13 Claims, 16 Drawing Sheets

Related U.S. Application Data

(60) Provisional application No. 62/113,174, filed on Feb. 6, 2015.

(51) Int. Cl.
  *G06N 3/08* (2006.01)
  *G06N 3/04* (2006.01)
  *G06N 7/00* (2006.01)
  *G06K 9/66* (2006.01)

(52) U.S. Cl.
  CPC ............ *G06K 9/6256* (2013.01); *G06K 9/66* (2013.01); *G06N 3/0454* (2013.01); *G06N 3/082* (2013.01); *G06N 7/005* (2013.01)

(58) Field of Classification Search
  CPC .......... G06N 3/02; G06N 3/082; G06N 7/005; G06N 3/08; G06N 3/04; G06T 2207/20084; G06T 2207/20081
  See application file for complete search history.

(56) References Cited

U.S. PATENT DOCUMENTS

| | | | | |
|---|---|---|---|---|
| 9,330,171 | B1* | 5/2016 | Shetty | G06T 3/00 |
| 9,400,919 | B2* | 7/2016 | Yin | G06K 9/00221 |
| 9,400,955 | B2* | 7/2016 | Garimella | G06N 3/082 |
| 9,530,047 | B1* | 12/2016 | Tang | G06K 9/00288 |
| 10,102,444 | B2* | 10/2018 | Kim | G16H 50/20 |
| 10,248,874 | B2* | 4/2019 | Moosaei | G06K 9/00825 |
| 10,346,726 | B2* | 7/2019 | Han | G06K 9/627 |
| 10,452,979 | B2* | 10/2019 | Park | G06N 3/0454 |
| 10,453,192 | B2* | 10/2019 | Hattori | G06K 9/6267 |
| 2005/0102246 | A1 | 5/2005 | Movellan et al. | |
| 2006/0034495 | A1* | 2/2006 | Miller | G06K 9/00214 382/118 |
| 2012/0143808 | A1* | 6/2012 | Karins | G06N 7/005 706/46 |
| 2013/0290222 | A1* | 10/2013 | Gordo | G06K 9/6259 706/12 |
| 2014/0180989 | A1* | 6/2014 | Krizhevsky | G06N 3/063 706/31 |
| 2015/0112897 | A1* | 4/2015 | Wang | G06T 5/20 706/12 |
| 2015/0238148 | A1* | 8/2015 | Georgescu | A61B 5/7267 600/408 |
| 2016/0117587 | A1* | 4/2016 | Yan | G06N 3/08 706/20 |

OTHER PUBLICATIONS

Jia, Yangqing, et al. "Caffe: Convolutional architecture for fast feature embedding." Proceedings of the 22nd ACM international conference on Multimedia. ACM, 2014. 4 pages (Year: 2014).*

Xu et al., "Scale—Invariant Convolutional Neural Network" (pp. 1-9) (Year: 2014).*

International Search Report of PCT application No. PCT/JP2016/000462 dated Mar. 8, 2016.

Min Lin et al., "Network in Network", arXiv:1312.4400v3, Mar. 4, 2014.

The Extended European Search Report from the European Patent Office (EPO) dated Feb. 5, 2018 for the related European Patent Application No. 16746308.2.

Yichong Xu et al: "Scale-Invariant Convolutional Neural Networks", Nov. 24, 2014 (Nov. 24, 2014), XP055442314, Retrieved from the Internet:URL:https://arxiv.org/pdf/1411.6369.pdf.

Minyoung Kim et al: "Deep Clustered Convolutional Kernels", Mar. 5, 2015 (Mar. 5, 2015), XP055442395, Retrieved from the Internet:URL:https://arxiv.org/pdf/1503.01824.pdf.

* cited by examiner

Algorithm 1 Deep Clustered Convolutional Kernels training algorithm
---
    Input: Initial network architecture net with parameters $\lambda$, noise variance $\sigma_n$ and jitter angle $\sigma_a$, stopping conditions $\delta_{0,1,2}$ and mini-batch size
    while $\triangle$ Validation Accuracy $> \delta_0$ do
        while $\triangle$Validation Accuracy $> \delta_1$ do
            //SPLIT
            $n_k$ = gaussianNoise($\sigma_n$)
            $a_k$ = gaussianNoise($\sigma_a$)
            $\lambda_1$ =concat($\lambda, \lambda + n_k$)
            $\lambda$ =concat($\lambda_1$, rotate(kernel($\lambda$),$a_k$))
            //FINETUNE
            while $\triangle$Validation Accuracy $> \delta_2$ do
                runSGD(M minibatches)
            end while
        end while
        //MERGE
        centroid =K means(kernels($\lambda$))
        A =nearest(kernels($\lambda$),(centroid)
        while $\triangle$Validation Accuracy $> \delta_2$ do
            runSGD(M minibatches)
        end while
    end while

FIG. 13

|        | MNIST | GTSRB1 | GTSRB-3DNN | CIFAR-10 |
|--------|-------|--------|------------|----------|
| ERR(%) | 0.82% | 2.44%  | 1.24%      | 10.4 %   |

FIG. 14

| LAYER           | # OF MAPS | filter |
|-----------------|-----------|--------|
| INPUT           | 3         |        |
| CONVOLUTIONAL   | 100       | 5X5    |
| MAX POOLING     | 100       | 2X2    |
| CONVOLUTIONAL   | 50        | 5X5    |
| MAX POOLING     | 50        | 2X2    |
| FULLY CONNECTED | 100       | 1X1    |
| FULLY CONNECTED | 10        | 1X1    |

FIG. 15

| No. | STAGE | CONV1 | CONV2 | ERR(%) |
|---|---|---|---|---|
| 1 | ORIGINAL | 100 | 50 | 0.82 |
| 2 | ORIGINAL | 200 | 50 | 0.78 |
| 3 | ORIGINAL | 300 | 50 | 0.75 |
| 4 | SPLIT [1] | 200 | 50 | 0.58 |
| 5 | MERGE [4] | 100 | 50 | 0.59 |

FIG. 16

| No. | STAGE | CONV1 | CONV2 | CONV3 | ERR(%) |
|---|---|---|---|---|---|
| 1 | ORIGINAL | 150 | 150 | 250 | 2.44 |
| 2 | MERGE [1] | 32 | 150 | 250 | 2.34 |
| 3 | MERGE [2] | 32 | 32 | 250 | 2.7 |
| 4N | SPLIT [3] | 32 | 64 | 250 | 2.25 |
| 5R | SPLIT [3] | 32 | 64 | 250 | 2.15 |
| 6 | SPLIT [1] | 300 | 150 | 250 | 2.24 |

| LAYER | #OF MAPS | filter(GTSRB-3DNN) |
| --- | --- | --- |
| INPUT | 3 | |
| CONVOLUTIONAL | 150 | 3X3, 3X3, 3X3 |
| MAX POOLING | 150 | 2X2, 2X2, 2X2 |
| CONVOLUTIONAL | 150 | 4X4, 4X4, 2X2 |
| MAX POOLING | 150 | 2X2, 2X2, 2X2 |
| CONVOLUTIONAL | 250 | 4X4, 4X4, 2X2 |
| MAX POOLING | 250 | 2X2, 2X2, 2X2 |
| FULLY CONNECTED | 500 | 1X1, 1X1, 1X1 |
| FULLY CONNECTED | 43 | 1X1, 1X1, 1X1 |

FIG. 19

| No. | STAGE | CONV1 | CONV2 | CONV3 | ERR(%) |
|---|---|---|---|---|---|
| 1 | ORIGINAL | 150 | 150 | 250 | 1.24 |
| 2 | ORIGINAL | 16 | 150 | 250 | 1.67 |
| 3 | MERGE [1] | 32 | 150 | 250 | 1.18 |
| 4 | MERGE [1] | 16 | 150 | 250 | 1.25 |
| 5 | SPLIT [1] | 300 | 150 | 250 | 1.21 |
| 6 | SPLIT [3] | 64 | 150 | 250 | 1.15 |

FIG. 20

| No. | STAGE | CONV1 | CONV2 | CONV3 | ERR(%) |
|---|---|---|---|---|---|
| 1 | ORIGINAL | 192 | 192 | 192 | 10.4 |
| 2 | SPLIT [1] | 384 | 192 | 192 | 10.29 |
| 3 | SPLIT [1] | 576 | 192 | 192 | 10.25 |
| 4 | MERGE [3] | 192 | 192 | 192 | 10.2 |
| 5 | SPLIT [1] | 192 | 192 | 384 | 10.04 |
| 6 | SPLIT [1] | 192 | 384 | 192 | 10.04 |
| 7 | MERGE [6] | 192 | 192 | 192 | 10.28 |

FIG. 21

| No. | STAGE | CONV1 | CONV2 | SPEED(ms) |
|---|---|---|---|---|
| 1.SIMPLE | ORIGINAL | 150 | 150 | 14.8 |
| 2.SIMPLE | MERGE [1] | 32 | 150 | 14.1 |
| 3.SIMPLE | MERGE [2] | 32 | 64 | 12.6 |
| 4.3-DNNs | ORIGINAL | 150 | 150 | 27.9 |
| 5.3-DNNs | MERGE [4] | 32 | 150 | 19.4 |

DETERMINATION METHOD AND RECORDING MEDIUM

BACKGROUND

1. Technical Field

The present disclosure relates to a determination method and a recording medium and, in particular, to a determination method and a recording medium for determining the structure of a convolutional neural network.

2. Description of the Related Art

In recent years, the performance of image recognition has dramatically increased by using Deep Learning. Deep Learning is a mythology used in machine learning based on a multi-layered neural network. For example, a convolutional neural network is used as the multi-layered neural network (refer to, for example, Min Lin, Qiang Chen, Shuicheng Yan, "Network In Network"). The convolutional neural network is formed from a multi-layered neural network that repeats convolution of local regions and pooling. This document describes, as the structure of a convolutional neural network, the structure of a neural network formed from a multi-convolutional layer generated by sandwiching a plurality of convolutional layers by pooling layers so that the performance of image recognition can increase.

SUMMARY

In one general aspect, the techniques disclosed here feature a determination method for determining the structure of a convolutional neural network. The determination method includes acquiring N filters having the weights trained using a training image group as the initial values, where N is a natural number greater than or equal to 1, and increasing the number of the filters from N to M, where M is a natural number greater than or equal to 2 and is greater than N, by adding a filter obtained by performing a transformation used in image processing fields on at least one of the N filters.

According to the present disclosure, a determination method for more easily determining the structure of a convolutional neural network can be realized.

It should be noted that general or specific embodiments may be implemented as a system, a method, an integrated circuit, a computer program, or a computer-readable recording medium, such as a CD-ROM, or any selective combination of a system, a method, an integrated circuit, a computer program, and a computer-readable recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 illustrates an example of the algorithm of the determination process performed by a determination apparatus according to EXAMPLE 1 in detail;

FIG. 13 illustrates identification performance values obtained when each of a plurality of datasets in EXAMPLE 2 is used;

FIG. 14 illustrates an example of a model structure using the MNIST dataset;

FIG. 15 illustrates the error rates obtained when the splitting process or the merging process according to the present disclosure is applied to the MNIST model structure;

FIG. 16 illustrates the error rates obtained when the splitting process or the merging process according to the present disclosure is applied to the GTSRB1 model structure;

FIG. 19 illustrates the error rate obtained when the splitting process or the merging process according to the present disclosure is applied to a GTSRB-3DNN model structure;

FIG. 20 illustrates the error rate obtained when the splitting process or the merging process according to the present disclosure is applied to a CIFAR-10 model structure; and FIG. 21 illustrates comparison of identification calculation times required when the merging process according to the present disclosure is performed.

DETAILED DESCRIPTION

Figure 1:
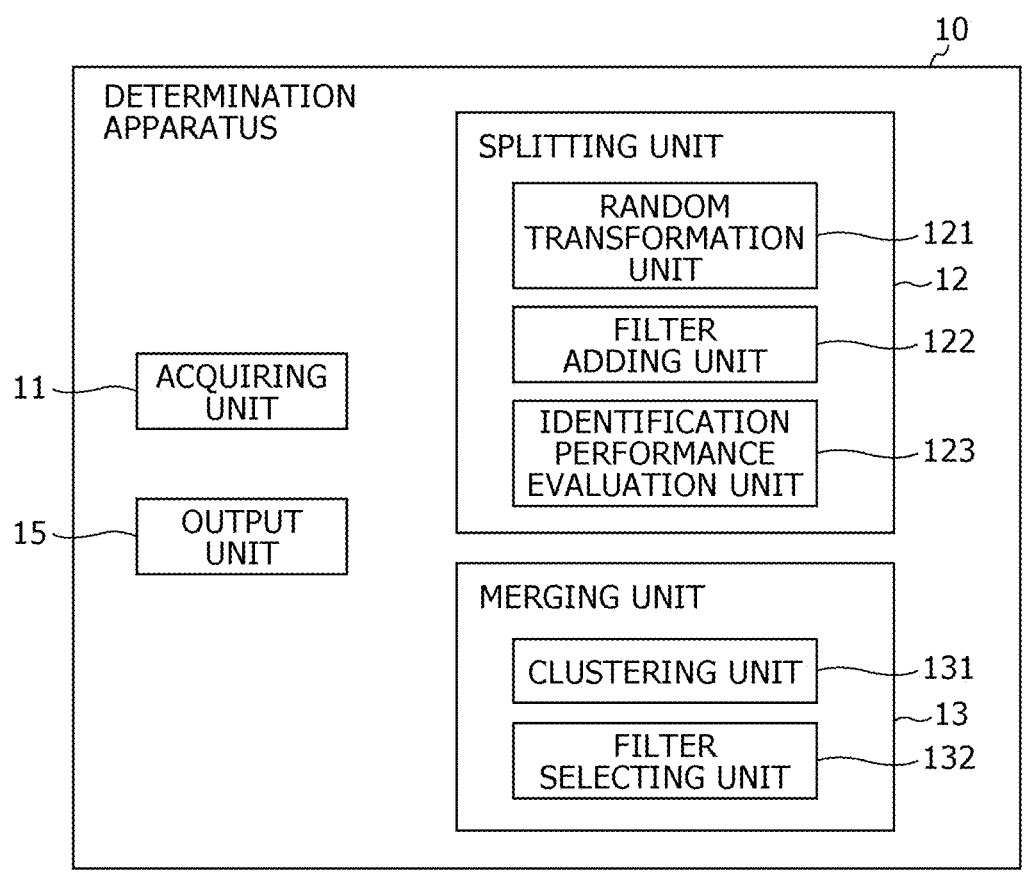
FIG. 1 is a block diagram of an example of the configuration of a determination apparatus according to an exemplary embodiment.

Underlying Knowledge Forming Basis of the Present Disclosure

In recent years, the performance of multi-layered neural networks, such as DNN (Deep Neural Network), has dramatically improved as a result of the networks being employed in machine learning, such as speech recognition or machine translation, in addition to image recognition. DNN has achieved the result of improving its performance by employing theoretically proven modeling and generalization capability. In practice, the result can be achieved by improving the training algorithm that detects the parameters at high speed, improving the dataset that continuously increases, and enhancing a new computer platform.

However, in general, determination of the parameters (i.e., so-called training) is started after the structure of the multi-layered neural network is manually determined by experts in the field. In addition, the above-described improvement of the performance largely depends on the structure of a multi-layered neural network and, thus, the structure of a multi-layered neural network is determined through a large number of repeated experiments conducted by an experienced and expert person.

For example, the above-mentioned non-patent literature "Network In Network" describes the structure of a neural network having multi convolutional layers formed by sandwiching a plurality of convolutional layers between pooling layers. However, such a structure is complicated and, thus, is a structure that only an expert can determine (design).

That is, it is difficult for a non-expert to determine (design) a good structure of a convolutional neural network effective for image recognition.

Accordingly, the present inventers conceived the idea of a determination method and the program for easily (or automatically) determining the structure of a convolutional neural network while determining the parameters.

That is, according to an aspect of the present disclosure, a determination method for determining the structure of a convolutional neural network is provided. The determination method includes acquiring N filters (N is a natural number greater than or equal to 1) having the weights trained using a training image group as the initial values and increasing the number of the filters from N to M (M is a natural number greater than or equal to 2 and is greater than N) by adding a filter obtained by performing a transformation used in image processing fields on at least one of the N filters.

Since the structure of a convolutional neural network can be easily determined in this manner, even a non-expert can use the structure of a convolutional neural network effective for image recognition.

In addition, for example, the increasing the number of the filters may include evaluating the identification performance of the M filters by causing the M filters to learn the weights by using the training image group. If the evaluated identification performance is less than or equal to the identification performance of the N filters, the increasing the number of the filters may be performed again.

In addition, for example, the determination method may further include merging the M filters into L filters (L is a natural number greater than or equal to 1 and is less than M) by clustering the M filters and selecting a filter located at the center of each of the clusters.

In addition, for example, in the merging, the M filters may be clustered into predetermined L clusters by using k-means clustering.

In addition, for example, in the merging, the M filters may be clustered by using Affinity propagation clustering.

In addition, for example, the transformation may include rotational transformation using a randomly determined angle and, in the increasing the number of the filters, a filter obtained by performing the rotational transformation on at least one of the N filters may be added.

In addition, for example, the transformation may include addition of Gaussian noise with randomly determined standard deviation and, in the increasing the number of the filters, a filter obtained by performing the addition of Gaussian noise on at least one of the N filters may be added.

In addition, for example, the transformation may include contrast transformation for obtaining a randomly determined contrast ratio and, in the increasing the number of the filters, a filter obtained by performing the contrast transformation on at least one of the N filters may be added.

In addition, for example, the transformation may include scale transformation for obtaining a randomly determined scale and, in the increasing the number of the filters, a filter obtained by performing the scale transformation on at least one of the N filters may be added.

Note that each of the embodiments below describes a general or specific example. A value, a shape, a constituent element, steps, and the sequence of steps used in the embodiments described below are only examples and shall not be construed as limiting the scope of the present disclosure. In addition, among the constituent elements in the embodiments described below, the constituent element that does not appear in an independent claim, which has the broadest scope, is described as an optional constituent element. In addition, all the embodiments may be combined in any way.

Exemplary Embodiment

A determination method for use in a determination apparatus 10 according to an exemplary embodiment and others are described below with reference to the accompanying drawings.

Configuration of Determination Apparatus

Figure 2A:
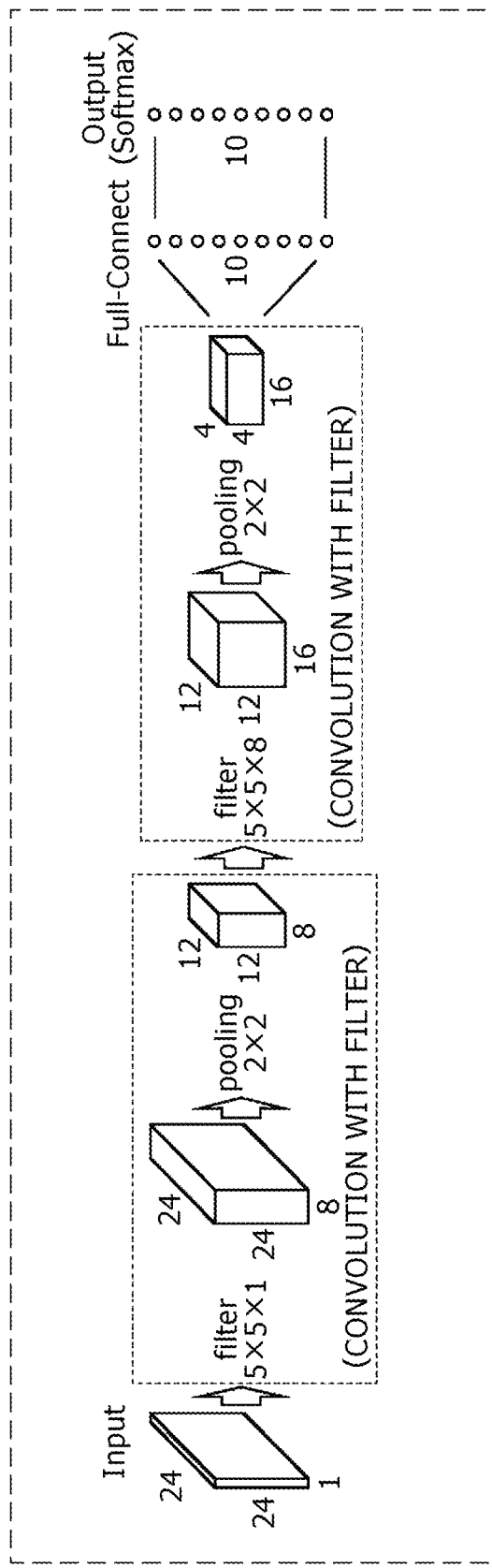
FIG. 2A is a schematic illustration of an identification process performed by a convolutional neural network.
Figure 2B:
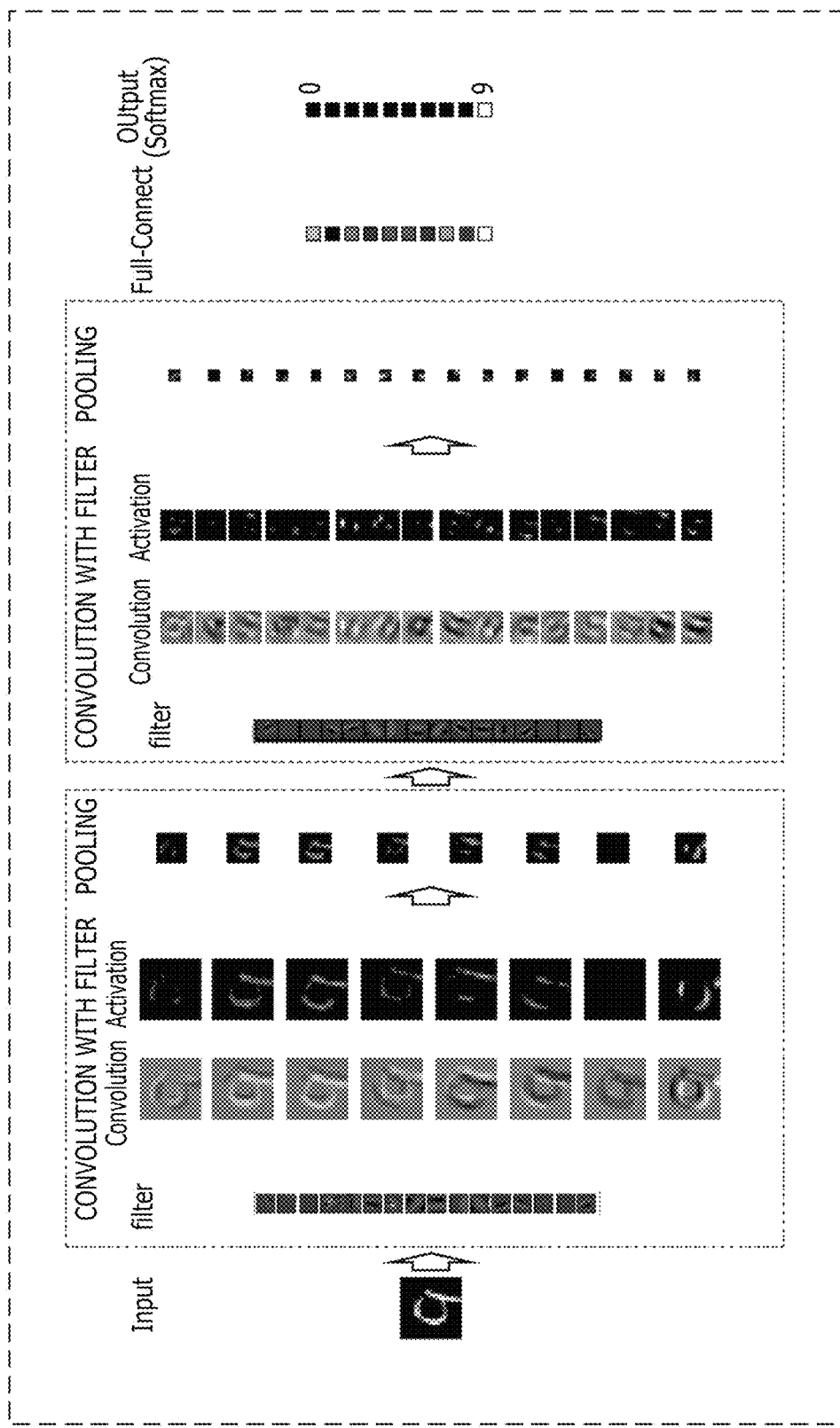
FIG. 2B is a schematic illustration of the identification process performed by the convolutional neural network.

FIG. 1 is a block diagram of an example of the configuration of the determination apparatus 10 according to the present exemplary embodiment. FIGS. 2A and 2B are schematic illustrations of an identification process performed by a convolutional neural network.

As illustrated in FIG. 1, the determination apparatus 10 includes an acquiring unit 11, a splitting unit 12, a merging unit 13, and an output unit 15. The determination apparatus 10 determines the structure of a convolutional neural network. The determination apparatus 10 is formed from, for example, a computer.

General processing performed by convolutional neural networks (CNNs) is described below.

Convolutional neural networks are widely used in image recognition fields. By performing a convolution of a two-dimensional image with a filter, a convolutional neural network extracts the feature of the image. As described above, the convolutional neural network is formed from a multi-layered network that repeats convolution and pooling. In this way, the convolutional neural network is caused to learn the coefficients of a filter that forms a convolutional layer, where the coefficients of the filter are effective for identification, by using a large amount of data, such as a large number of training images (a training image group). The coefficients can be obtained through learning to acquire invariance to a variety of transformations by using a large amount of data by repeating convolution with a filter and pooling for collecting the response from a predetermined region. Note that it is already known that the identification performance of a convolutional neural network depends on a filter that forms the convolutional layer.

In an example in FIGS. 2A and 2B, a convolutional neural network is illustrated. The convolutional neural network is formed from a two-layered network having coefficients of filters trained by using a large amount of data (a training image group) so as to be effective for image identification. In addition, in the example, a process to cause the convolutional neural network to identify the image of the number 9 is illustrated. Note that in FIGS. 2A and 2B, a ramp function (ReLU) is used as an activation function after convolution with a filter.

The determination apparatus 10 according to the present exemplary embodiment determines, as the structure of a convolutional neural network, a filter that forms a convolutional layer of the convolutional neural network. Note that if there are a plurality of convolutional layers, the determination apparatus 10 determines a filter that forms at least one of the convolutional layers. At that time, the determination apparatus 10 may determine a filter that forms all the convolutional layers. In this manner, the determination apparatus 10 can determine a convolutional neural network formed from a convolutional layer having the determined filter.

Acquiring Unit

The acquiring unit 11 acquires a plurality of filters serving as the initial values and training images.

More specifically, the acquiring unit 11 acquires, as the initial values, N filters that have learned weights using a training image group (N is a natural number greater than or equal to 1). Note that the acquiring unit 11 may acquire, as the initial values, a plurality of filters subjected to a splitting process performed by the splitting unit 12 or a plurality of filters subjected to a merging process performed by the merging unit 13.

In addition, the acquiring unit 11 acquires the training image group. As used herein, the term "training image group" refers to a prepared dataset of a plurality of images, such as the MNIST dataset or the GTSRB dataset.

Splitting Unit

Figure 3:
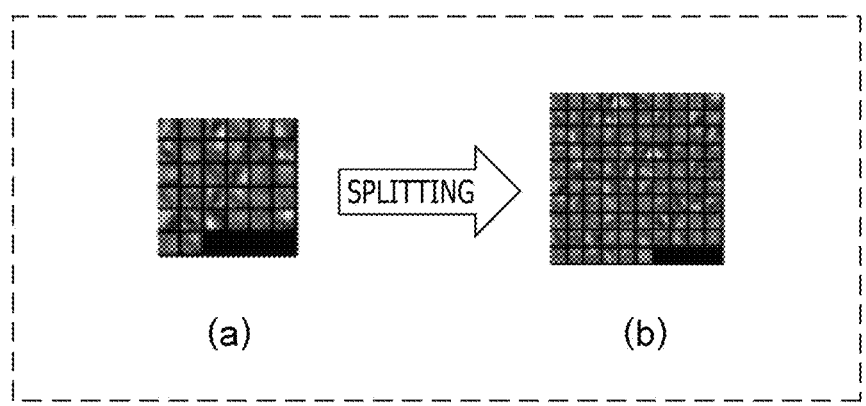
FIG. 3 is a schematic illustration of a splitting process performed by the determination apparatus illustrated in FIG. 1.
Figure 4:
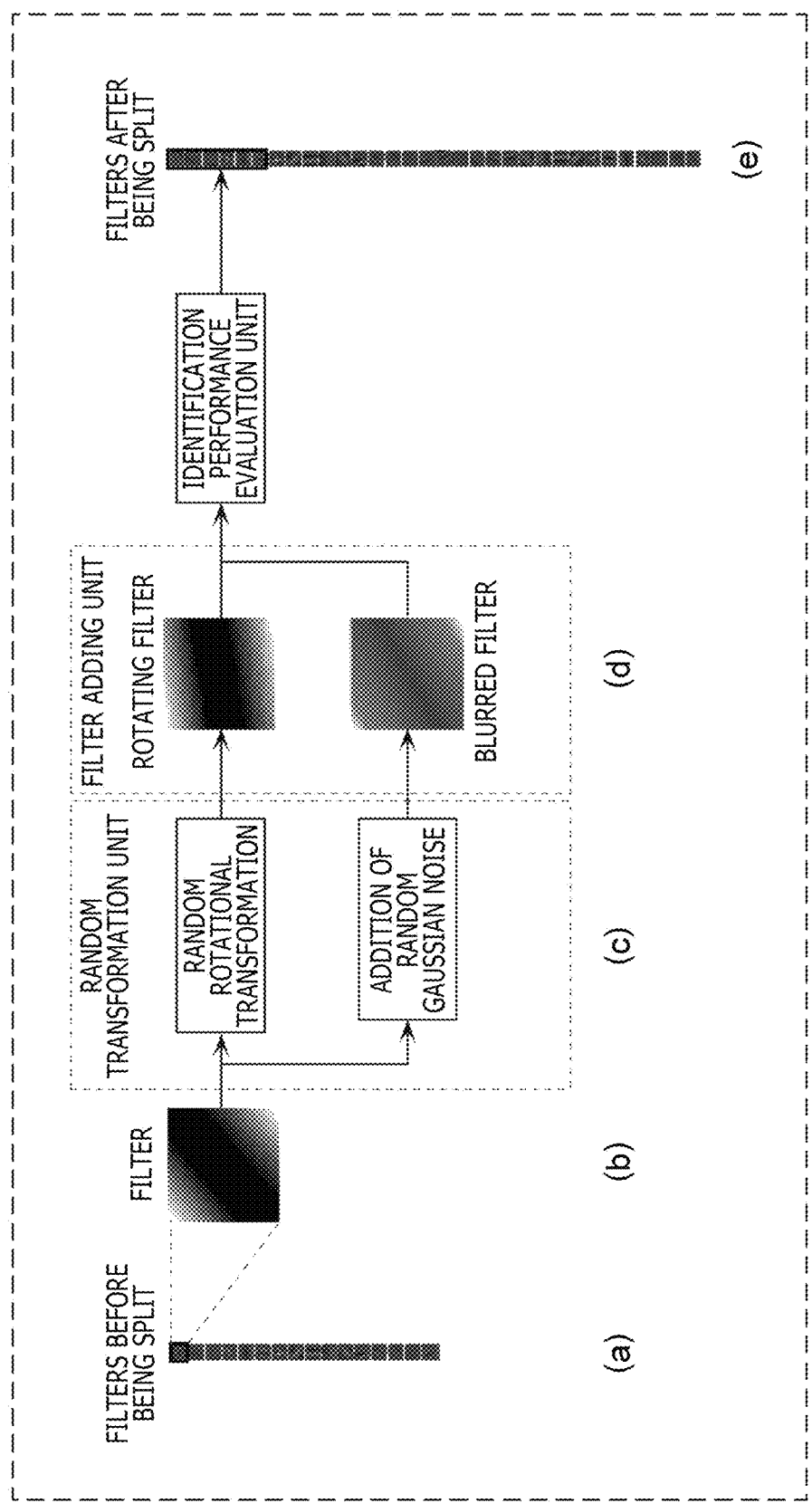
FIG. 4 illustrates an example of a splitting process performed by a splitting unit illustrated in FIG. 1.

FIG. 3 is a schematic illustration of a splitting process performed by the determination apparatus 10 illustrated in FIG. 1. FIG. 4 illustrates an example of a splitting process performed by the splitting unit 12 illustrated in FIG. 1. Note that a plurality of filters illustrated in FIG. 3(a) correspond to a plurality of filters that form one of two convolutional layers illustrated in FIG. 2B. In addition, filters before being split illustrated in FIG. 4(a) correspond to the plurality of filters illustrated in FIG. 3(a).

The splitting unit 12 performs a splitting process on the plurality of filters acquired as initial values (e.g., the N filters acquired by the acquiring unit 11). For example, as illustrated in FIG. 3(a), the splitting unit 12 performs a splitting process on a plurality of filters (32 filters in FIG. 3) and increases the number of the filters to the number of filters illustrated in FIG. 3(b) (96 filters in FIG. 3).

More specifically, the splitting unit 12 performs a splitting process to perform a transformation used in image processing fields on at least one of the N filters serving as the initial values and adds the transformed filter so that the number of the filters is increased from N to M (M is a natural number greater than or equal to 2 and is greater than N).

At that time, if the identification performance of the M filters is higher than that of the N filters, the splitting unit 12 may further perform a splitting process to perform a transformation used in image processing fields on at least one of the M filters and adds the transformed filter so that the number of the filters is increased from M to P (P is a natural number greater than or equal to 3 and is greater than M). In addition, the splitting unit 12 may repeat such a splitting process a predetermined number of times, which is a number predetermined by, for example, a user who uses the determination apparatus 10. Note that the number of the filters after being increased may be predetermined by a user of the determination apparatus 10.

In addition, if the identification performance of the M filters is lower than or equal to that of the N filters, the splitting unit 12 may further perform the splitting process on the N filters.

Note that in the above description, the identification performance of the plurality of filters represents the identification performance of a convolutional neural network having the plurality of filters. This also applies to the following description.

According to the present exemplary embodiment, as illustrated in FIG. 1, the splitting unit 12 includes a random transformation unit 121, a filter adding unit 122, and an identification performance evaluation unit 123.

The random transformation unit 121 performs a transformation used in image processing fields on at least one of the filters acquired by the acquiring unit 11 as the initial values. The filter adding unit 122 adds, to the plurality of filters acquired by the acquiring unit 11 as the initial values and stored in a memory (not illustrated), the filter subjected to the transformation that is used in image processing fields and that is performed by the random transformation unit 121.

At that time, the random transformation unit 121 can perform a transformation selected from among existing image transformations (a transformation set) used in image processing fields. For example, when the transformation performed by the random transformation unit 121 is a rotational transformation using a randomly determined angle, the random transformation unit 121 can perform the rotational transformation on at least one of the N filters. Thereafter, the filter adding unit 122 can add the filter subjected to the rotational transformation performed by the random transformation unit 121.

In addition, for example, if a transformation performed by the random transformation unit 121 is addition of Gaussian Noise with randomly determined standard deviation, the random transformation unit 121 can add the Gaussian noise to at least one of the above-described N filters. Thereafter, the filter adding unit 122 can add the filter with Gaussian noise added by the random transformation unit 121.

In addition, for example, when the transformation performed by the random transformation unit 121 includes contrast transformation for obtaining a randomly determined contrast ratio, the random transformation unit 121 can perform the contrast transformation on at least one of the N filters. Thereafter, the filter adding unit 122 can add the filter subjected to the contrast transformation by the random transformation unit 121.

In addition, for example, when the transformation performed by the random transformation unit 121 is a scale transformation for obtaining a randomly determined scale, the random transformation unit 121 can perform the scale transformation on at least one of the N filters. Thereafter, the filter adding unit 122 can add the filter subjected to the scale transformation by the random transformation unit 121.

Note that the transformation is not limited to rotational transformation using a randomly determined angle, addition of Gaussian Noise with randomly determined standard deviation, contrast transformation to obtain a randomly determined contrast ratio, or scale transformation to obtain a randomly determined scale. For example, the transformation may be a contrast reversal transformation or isometric transformation or may include a combination of two or more of these transformations (the transformation set). If rotational transformation using a randomly determined angle (random rotational transformation) and addition of Gaussian Noise with randomly determined standard deviation (random Gaussian Noise addition) are selected from the transformation set, it can be expected that the identification performance of the convolutional neural network is consistently improved. Such a case is described below with reference to FIG. 4.

The filters before being split illustrated in FIG. 4(a) are filters acquired by the acquiring unit 11 as the initial values, and the filter illustrated in FIG. 4(b) is one of the filters before being split. As illustrated in FIG. 4(c), the random transformation unit 121 performs the above-described rotational transformation ("random rotational transformation" in the drawing) and the above-described addition of Gaussian noise ("random Gaussian noise addition" in the drawing) on the filter illustrated in FIG. 4(b) and generate a rotating filter and a blurred filter. As illustrated in FIG. 4(d), the filter adding unit 122 temporarily adds the rotating filter and the blurred filter generated by the random transformation unit 121 to the plurality of filters serving as the initial values. The identification performance evaluation unit 123 (described below) evaluates the identification performance of the filters including the filters serving as the initial values and the added rotating filter and blurred filter. If the identification performance of the filters is higher than that of the filters serving as the initial value, the filters including the filters serving as the initial values and the added rotating filter and blurred filter are employed as filters after being split, as illustrated in FIG. 4(e). Thereafter, the splitting process performed by the splitting unit 12 is completed. Note that the filters after being split illustrated in FIG. 4(e) correspond to the filters illustrated in FIG. 3(b).

The identification performance evaluation unit 123 causes the filters that have increased in number due to the added filters to learn the weights using the training image group and evaluates the identification performance of the filters increased in number. More specifically, the identification performance evaluation unit 123 causes the filters of the convolutional neural network which include the filters that have increased in number due to the added filter in the convolutional layer to learn the weights using the training image group and evaluates the identification performance of the filters increased in number.

If the evaluated identification performance of the filters increased in number is higher than that of the plurality of filters serving as the initial values and acquired by the acquiring unit 11, the identification performance evaluation unit 123 employs the filters increased in number as the filters after being split. Note that if the evaluated identification performance of the filters increased in number is lower than or equal to that of the plurality of filters serving as the initial values and acquired by the acquiring unit 11, the identification performance evaluation unit 123 causes the random transformation unit 121 to perform the splitting process on the plurality of filters serving as the initial values again.

Still more specifically, the identification performance evaluation unit 123 causes, for example, M filters increased in number from N filters to learn the weights using the training image group and evaluates the identification performance of the M filters. If the evaluated identification performance of the M filters is higher than that of the N filters serving as the initial values, the identification performance evaluation unit 123 employs the M filters as the filter after being split. However, if the evaluated identification performance of the M filters is lower than or equal to that of the N filters serving as the initial values, the identification performance evaluation unit 123 causes the random transformation unit 121 to perform the splitting process on the N filters serving as the initial values again.

Note that while the present exemplary embodiment has been described with reference to the splitting unit 12 that performs a splitting process using the plurality of filters acquired by the acquiring unit 11 as the initial values, the processing is not limited thereto. The splitting unit 12 may perform a splitting process again using, as the initial values, the filters after being split through the splitting process or perform a splitting process using, as the initial values, merged filters output from the merging unit 13.

In addition, to perform a splitting process a plurality of times, the identification performance evaluation unit 123 can compare the identification performance of the filters increased in number through a splitting process with the identification performance of the filters increased in number through the immediately previous splitting process instead of the initial values.

Merging Unit

Figure 5:
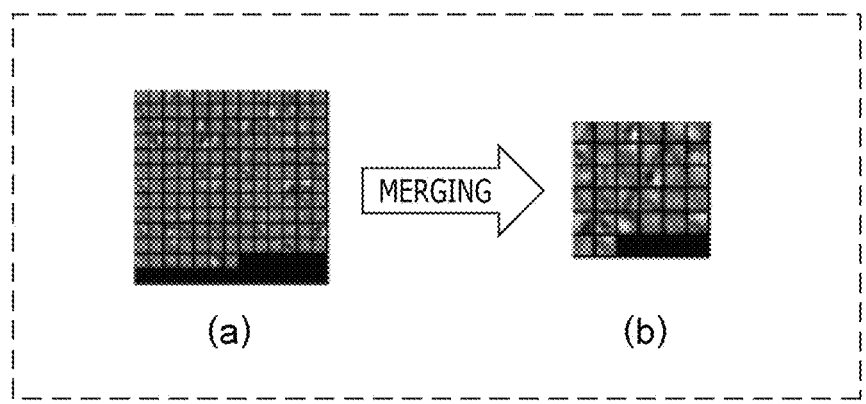
FIG. 5 is a schematic illustration of a merging process performed by the determination apparatus illustrated in FIG. 1.
Figure 6:
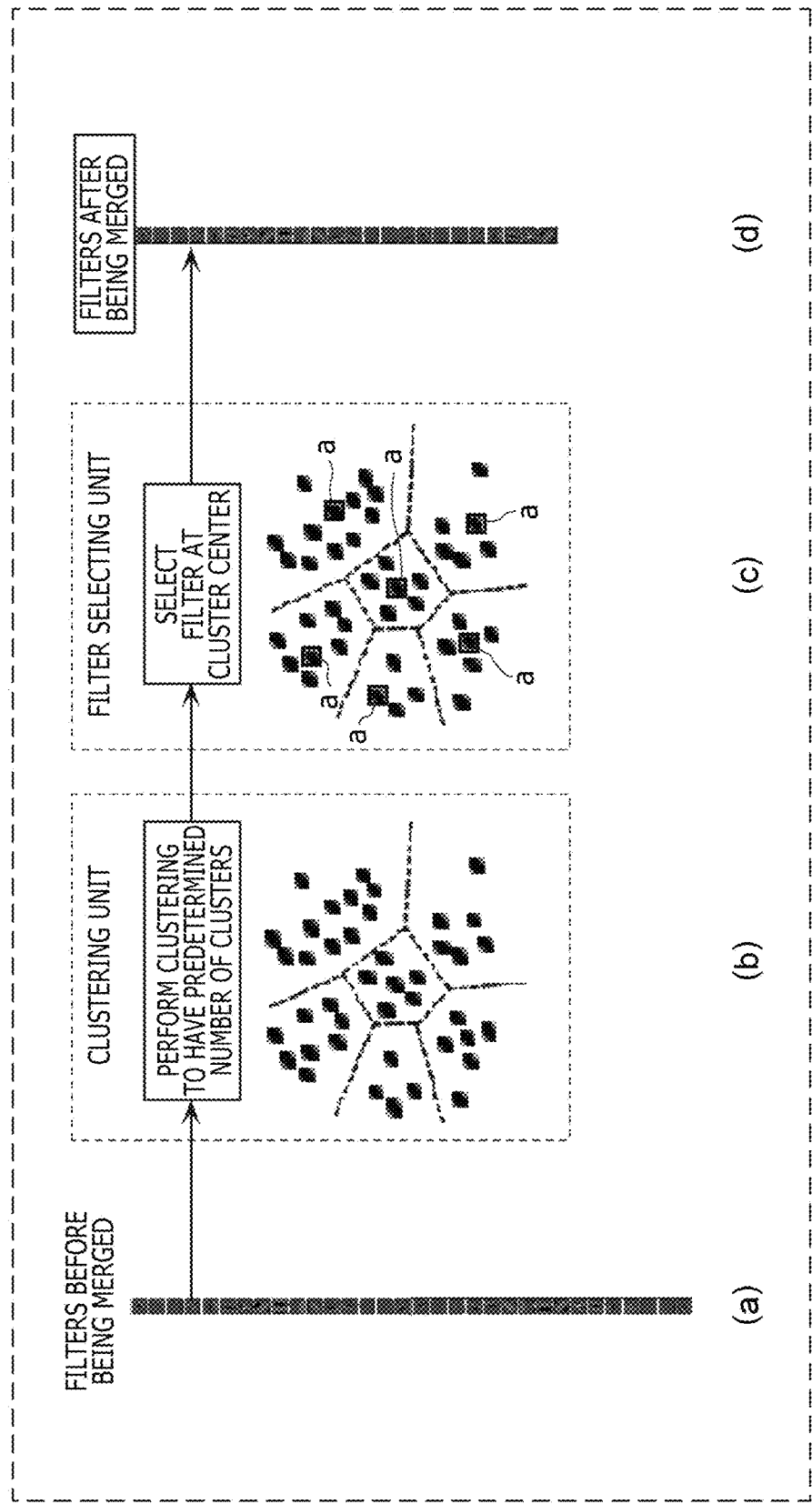
FIG. 6 illustrates an example of a merging process performed by a merging unit illustrated in FIG. 1.

FIG. 5 is a schematic illustration of a merging process performed by the determination apparatus 10 illustrated in FIG. 1. FIG. 6 illustrates an example of the merging process performed by the merging unit 13 illustrated in FIG. 1. Note that a plurality of filters illustrated in FIG. 6(a) (filters before being merged) correspond to the plurality of filters illustrated in FIG. 5(a), and a plurality of filters illustrated in FIG. 6(d) (filters after being merged) correspond to the plurality of filters illustrated in FIG. 5(b).

The merging unit 13 performs a merging process on the plurality of filters acquired as the initial values, such as the N filters acquired by the acquiring unit 11 or the filters after being split through the splitting process. For example, the merging unit 13 performs the merging process on a plurality of filters illustrated in FIG. 5(a) (156 filters in the drawing) and decreases the number of the filters to the number illustrated in FIG. 5(b) (32 in the drawing).

More specifically, the merging unit 13 clusters the filters after being split through the splitting process performed by the splitting unit 12 and selects a filter located at the cluster center of each of clusters. In this manner, the merging unit 13 performs the merging process to reduce the number of the plurality of filters. This is because overlearning can be prevented, and the identification performance can be increased (e.g., the error ratio in identification can be reduced, and image recognition can be performed more accurately). Note that the plurality of filters on which the merging unit 13 performs the merging process are not limited to the filters after being split through the splitting process performed by the splitting unit 12. The plurality of filters may be the plurality of filters acquired by the acquiring unit 11 as the initial values.

According to the present exemplary embodiment, as illustrated in FIG. 1, the merging unit 13 includes a clustering unit 131 and a filter selecting unit 132.

The clustering unit 131 clusters the M filters, which are the filters after being split through the splitting process performed by the splitting unit 12. As a result, the clustering unit 131 clusters the M filters into L clusters.

At that time, the clustering unit 131 may cluster the M filters into L clusters (L is a predetermined number) using k-means clustering. Alternatively, the clustering unit 131 may cluster the M filters using Affinity propagation clustering so that L clusters are obtained. k-means clustering is a technique to classify data into K clusters (K is a given number) using the average of clusters as the data distribution. In contrast, Affinity propagation clustering is a technique that has been developed by Frey et al during recent years. Affinity propagation clustering does not require predetermination of the number of clusters, and the algorithm automatically determines the number of clusters. In addition, in Affinity propagation clustering, the responsibility and availability are alternately updated until convergence. Accordingly, Affinity propagation clustering has no initial value dependence and, therefore, has a clustering accuracy higher than that of existing clustering techniques, such as k-means clustering. Note that since clustering using k-means clustering or Affinity propagation clustering has already been widely used, detailed description of the clustering is not given here.

Among the M filters clustered into L clusters by the clustering unit 131 and stored in a memory (not illustrated), the filter selecting unit 132 selects the filters located at the cluster centers. At that time, for example, the filter selecting unit 132 can calculate the center of mass of a plurality of filters belonging to each of the L clusters and select the filter that is the closest to the center of mass. In this manner, the merging unit 13 merges the M filters after being split through the splitting process performed by the splitting unit 12 into L filters (L is a natural number greater than or equal to 1 and is less than M).

An example of clustering performed by the clustering unit 131 using k-means clustering is described below with reference to FIG. 6. Note that the filters before being merged illustrated in FIG. 6(a) are the split filters after being split illustrated in FIG. 4(e) and are the filters after being split through the splitting process performed by the splitting unit 12. In addition, FIG. 6(b) illustrates an example of the clustering performed by determining a border line in the data distribution using k-means clustering so that a predetermined number of clusters are obtained.

As illustrated in FIG. 6(b), the clustering unit 131 clusters the filters before being merged illustrated in FIG. 6(a) using k-means clustering so that the number of filters is the number predetermined by, for example, the user of the determination apparatus 10. Thereafter, as illustrated in FIG. 6(c), the filter selecting unit 132 selects a filter that is the closest to the cluster center of each of a predetermined number of clusters (filters "a" in the drawing) and employs the selected filters as filters after being merged.

Note that the clustering unit 131 may cluster the N filters acquired by the acquiring unit 11 as the initial values. In such a case, among the N filters clustered by the clustering unit 131 and stored in a memory (not illustrated), the filter selecting unit 132 selects a filter located at the center of each of the clusters. In this manner, the merging unit 13 can merge the N filters acquired by the acquiring unit 11 as the initial values so that the number of filters is smaller than N.

In addition, the merging unit 13 may include the identification performance evaluation unit that causes the filters after being merged to learn the weights using the training image group and evaluates the identification performance of the filters after being merged. In such a case, if the identification performance evaluated by the identification performance evaluation unit is lower than or equal to that of the filters before being merged, the identification performance evaluation unit performs the merging process again. If the merging unit 13 performs clustering based on k-means clustering, It is desirable that the merging unit 13 perform the merging process again after changing the predetermined number of clusters. In contrast, if the merging unit 13 performs clustering based on Affinity propagation clustering, It is desirable that the merging unit 13 perform the merging process after changing parameters in the algorithm, such as the on-diagonal elements of a similarity matrix.

Output Unit

The output unit 15 outputs the filters split through the splitting process performed by the splitting unit 12 or the filters merged through the merging process performed by the merging unit 13 as filters that constitute the convolutional neural network determined by the determination apparatus 10. Note that the output unit 15 is not an essential constituent element. The output unit 15 may be a memory. In such a case, the output unit 15 stores the filters split through the splitting process performed by the splitting unit 12 or the filters merged through the merging process performed by the merging unit 13 as filters that constitute the convolutional neural network determined by the determination apparatus 10.

Determination Process Performed by Determination Apparatus

A determination process performed by the determination apparatus 10 having the above-described configuration is described with reference to the accompanying drawings.

Figure 7:
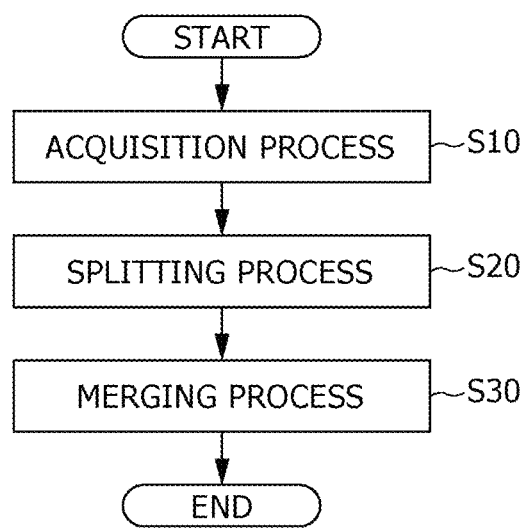
FIG. 7 is a flowchart illustrating an example of the determination process according to the exemplary embodiment.
Figure 8:
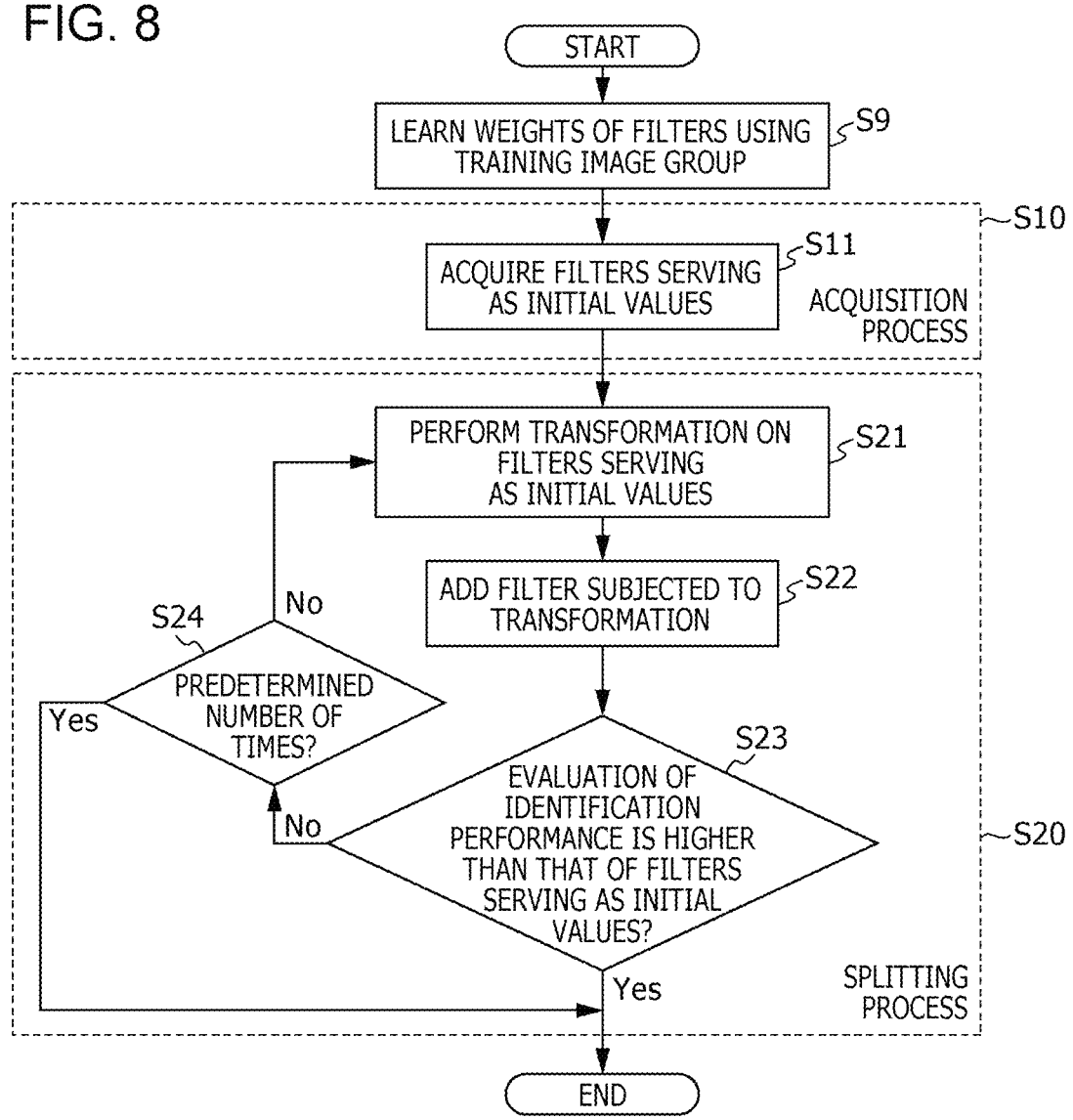
FIG. 8 is a flowchart illustrating an example of a detailed process performed in step S20 illustrated in FIG. 7.
Figure 9:
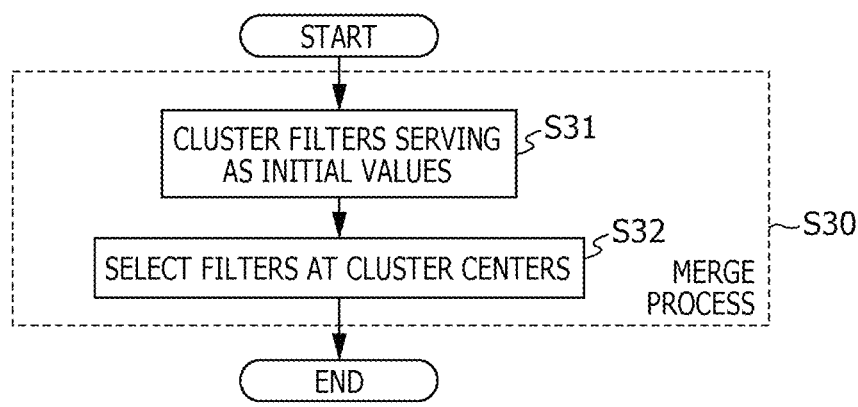
FIG. 9 is a flowchart illustrating an example of a detailed process performed in step S30 illustrated in FIG. 7.

FIG. 7 is a flowchart illustrating an example of the determination process according to the present exemplary embodiment. FIG. 8 is a flowchart illustrating an example of the process in step S20 illustrated in FIG. 7 in detail. FIG. 9 is a flowchart illustrating an example of the process in step S30 illustrated in FIG. 7 in detail.

In step S10, the determination apparatus 10 performs an acquisition process first.

More specifically, before the process in step S10 is performed, the weights of a plurality of filters that form at least one convolutional layer constituting a convolutional neural network are learned using a training image group (S9). Among the plurality of filters having weights learned using the training image group, the determination apparatus 10 acquires N filters that form at least one convolutional layer (N is a natural number greater than or equal to 1) as the initial values (S11).

Subsequently, in step S20, the determination apparatus 10 performs a splitting process.

More specifically, the determination apparatus 10 performs transformation used in image processing fields on at least one of the N filters serving as the initial values and acquired in step S11 (S21) and adds the filter subjected to the transformation used in image processing fields to the N filters serving as the initial values (S22). In this manner, the determination apparatus 10 can increase the N filters serving as the initial values to M filters (M is a natural number greater than or equal to 2 and is greater than N). At that time, the transformation can be selected from the above-described transformation set and be performed. Since the details have already been described above, description is not repeated. Subsequently, the determination apparatus 10 causes the M filters to learn the weights using the training image group. Thereafter, the determination apparatus 10 evaluates the identification performance of the M filters and determines whether the identification performance of the M filters is higher than that of the N filters serving as the initial values (S23). If, in step S23, the identification performance of the M filters is lower than or equal to that of the N filters (No in S23) and the number of the splitting processes performed is less than or equal to a predetermined value (a specified number of times) (No in S24), the processing returns to step S21, where the splitting process is performed again. However, if the identification performance of the M filters is higher than that of the N filters (Yes in S23), the splitting process is completed.

Note that if the splitting process is repeated the predetermined number of times (the specified number of times), the determination apparatus 10 can acquire, as filters serving as the initial values, the filters after being split, which are M filters subjected to the splitting process, in step S10 and perform the process in step S20 again.

Subsequently, in step S30, the determination apparatus 10 performs the merging process.

More specifically, the determination apparatus 10 clusters the M filters subjected to the splitting process in step S20 and serving as the initial values (S31). As a result, the determination apparatus 10 clusters the M filters subjected to the splitting process in step S20 into L clusters (L is a natural number greater than or equal to 1 and is less than M). Subsequently, the determination apparatus 10 selects a filter located at the center of each of the L clusters (S32). In this manner, the determination apparatus 10 merges the M filters into L filters, where L is less than M.

Note that the splitting process in step S20 and the merging process in step S30 may be independently performed. Alternatively, the merging process in step S30 may be performed first and, thereafter, the splitting process in step S20 may be performed. Still alternatively, as described above, the splitting process in step S20 may be performed a predetermined number of times (a specified number of times) and, thereafter, the merging process in step S30 may be performed.

Effectiveness of Determination Process

The effectiveness of the above-described determination process performed by the determination apparatus 10 is described with reference to examples.

EXAMPLE 1

FIG. 10 illustrates an example of the algorithm of the determination process performed by the determination apparatus 10 according to EXAMPLE 1 in detail.

In FIG. 10, the algorithm described in "//SPLIT" is an example of the algorithm of the above-described splitting process. Also, the algorithm described in "//MERGE" is an example of the algorithm of the above-described merging process. In addition, "$\sigma_0$, $\sigma_1$, $\sigma_2$" represent the evaluation values of the identification performance. "Kernel" represents a filter that constitutes at least one of the convolutional layers of the convolutional neural network.

Figure 11:
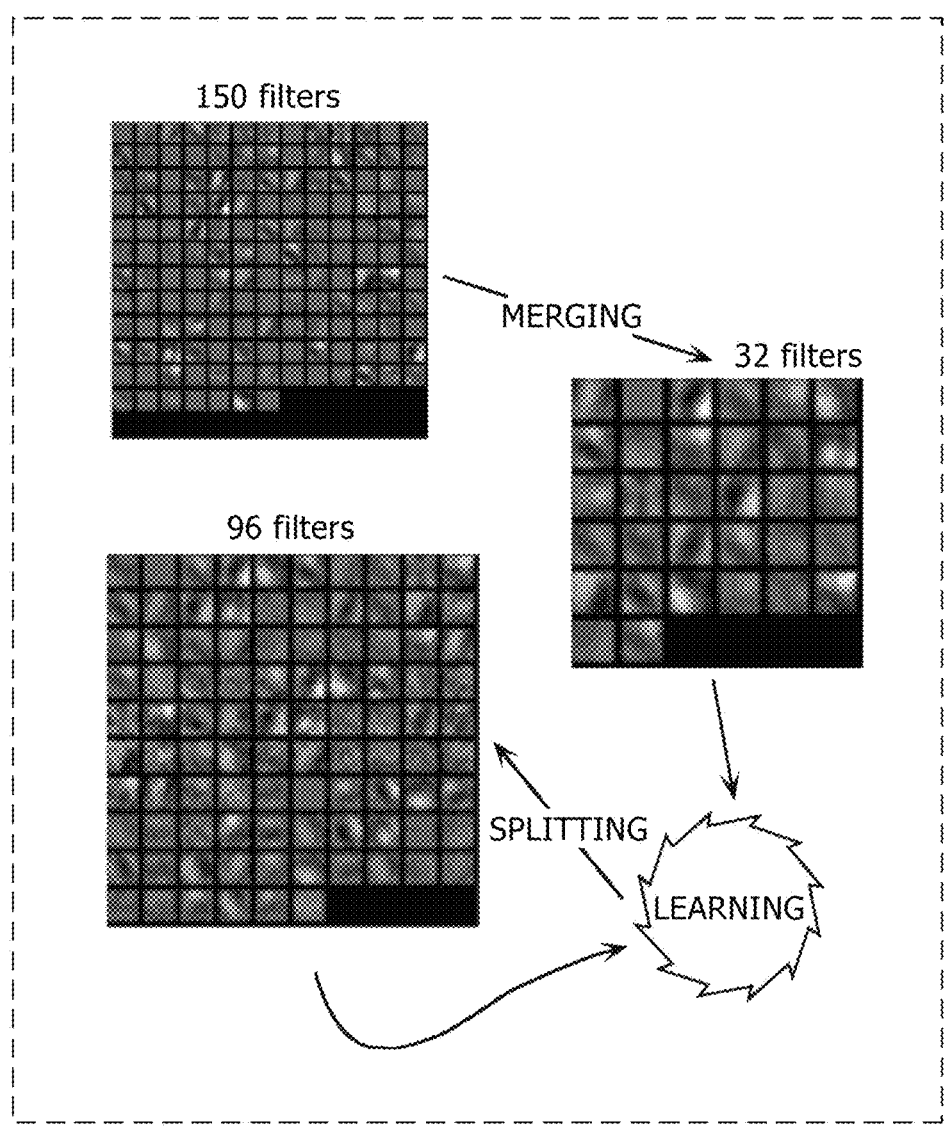
FIG. 11 illustrates an example of the determination process performed by the determination apparatus according to EXAMPLE 1.

FIG. 11 illustrates an example of the determination process performed by the determination apparatus 10 according to EXAMPLE 1. That is, in the present example, the merging process is performed first and, thereafter, the splitting process is performed.

More specifically, the determination apparatus 10 according to EXAMPLE 1 performs a merging process on 150 filters serving as the initial values so as to reduce the number of the filters from 150 to 32. Thereafter, the determination apparatus 10 causes the 32 filters to learn the weights using the training image group and evaluates the identification performance of the 32 filters. Note that as illustrated in FIG. 10, in the merging process according to EXAMPLE 1, clustering is performed using k-means clustering.

Subsequently, the determination apparatus 10 according to EXAMPLE 1 performs a splitting process on the 32 filters having weights learned using the training image group so that the number of filters is increased from 32 to 96. Thereafter, the determination apparatus 10 causes the 96 filters to learn the weights using the training image group and evaluates the identification performance of the 96 filters. Note that in the splitting process according to EXAMPLE 1, as illustrated in FIG. 10, rotational transformation using a randomly determined angle and addition of Gaussian noise with the randomly determined standard deviation are performed.

FIGS. 12A to 12D illustrate the effectiveness of the merging process according to the present example.

Figure 12A:
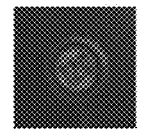
FIG. 12A illustrates the effectiveness of the merging process according to EXAMPLE 1.

FIG. 12A illustrates an example of a test image in which a sign with the number "120" on it is inclined at about 30 degrees. Note that the test image illustrated in FIG. 12A is erroneously classified by a convolutional neural network having filters that have the weights trained using a training image and that serve as the initial values.

Figure 12B:
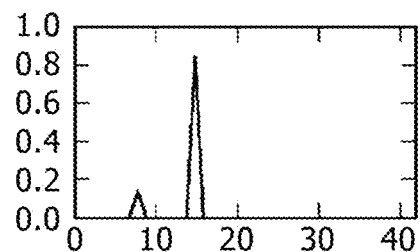
FIG. 12B illustrates the effectiveness of the merging process according to EXAMPLE 1.

FIG. 12B illustrates the softmax probability of the test image illustrated in FIG. 12A. In FIG. 12B, the response value to the output of each of 43 classes of the convolutional neural network having the filters serving as the initial values is indicated in the form of softmax probability. Neural nets for category classification output the highest value of output probability as the result of recognition. When the convolutional neural network having filters as the initial values classifies (identifies) the test image illustrated in FIG. 12A (correct label=7), a large response value is output at category 15. Thus, it can be seen that erroneous classification occurs.

Figure 12C:
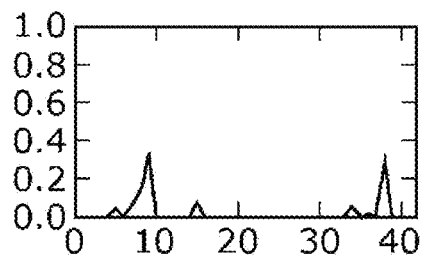
FIG. 12C illustrates the effectiveness of the merging process according to EXAMPLE 1.

FIG. 12C illustrates an example of the softmax probability of the test image illustrated in FIG. 12A and classified by a convolutional neural network having the filters subjected to the splitting process illustrated in FIG. 11. As can be seen from FIG. 12C, when the convolutional neural network having the filters subjected to the splitting process classifies (identifies) the test image illustrated in FIG. 12A, the response value for the label is improved. That is, erroneous classification does not occur, and the test image is correctly classified.

Figure 12D:
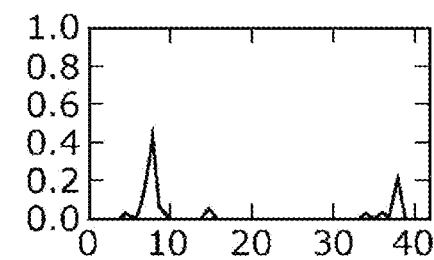
FIG. 12D illustrates the effectiveness of the merging process according to EXAMPLE 1.

FIG. 12D illustrates an example of the softmax probability of the image illustrated in FIG. 12A and classified by the convolutional neural network having 32 filters after the merging process illustrated in FIG. 11. As can be seen from FIG. 12D, when the convolutional neural network having 32 filters after the merging process classifies (identifies) the test image illustrated in FIG. 12A, the response value illustrated in FIG. 12C is improved more. That is, erroneous classification does not occur, and the test image is correctly classified.

EXAMPLE 2

The effectiveness of the splitting process and the merging process according to the present disclosure has been verified using a plurality of datasets formed from training images and test images. The result of experiment is described below as EXAMPLE 2.

FIG. 13 illustrates identification performance values obtained when each of a plurality of datasets in EXAMPLE 2 is used. In FIG. 13, the identification performance value (the reference value) obtained when each of Mixed National Institute of Standards and Technology database (MNIST) dataset, German Traffic Sign Recognition Benchmark (GTSRB) dataset, and Canadian Institute for Advanced Research (CIFAR-10) dataset is used is illustrated.

MNIST

FIG. 14 illustrates an example of a model structure using MNIST dataset (MNIST model structure). The MNIST dataset includes 60,000 training images and 10,000 test images of hand-written numbers each having a size of 28×28. As illustrated in FIG. 14, the MNIST model structure is formed from a convolutional neural network including two connection layers, two convolutional layers, and a pooling layer subsequent to each of the convolutional layers that use the ReLU activation function. In FIG. 13, an error rate of 0.82% is presented as the error rate which indicates the identification performance value (the reference value) obtained when the test images in the MNIST dataset are identified using the MNIST model structure trained using the training images in the MNIST dataset.

FIG. 15 illustrates the error rates obtained when the splitting process or the merging process according to the present disclosure is applied to the MNIST model structure. In FIG. 15, SPLIT[1] indicates that the No. 1 filters (ORIGINAL) are split, and MERGE[4] indicates that the No. 4 filters SPLIT[1] are merged. In FIG. 15, an error rate of 0.58% is presented as the error rate obtained when 100 filters that constitute a first convolutional layer of the two convolutional layers of the MNIST model structure (ORIGINAL) are split through the splitting process to increase the number of filters from 100 to 200 and, thereafter, the weights are learned using the training images again (SPLIT[1]). In addition, an error rate of 0.59% is presented as the error rate obtained when 200 filters split through the splitting process (SPLIT[1]) are reduced to 100 filters through the merging process and, thereafter, the weights are learned using the training images again (MERGE[4]).

In addition, as a comparative example, error rates of 0.78% and 0.75% are presented as the error rates obtained when 200 and 300 filters are trained from the initial state, respectively, without performing the splitting process on 100 filters that constitute the first convolutional layer of the MNIST model structure.

It can be seen that the error rate obtained when the splitting process or the merging process according to the present disclosure is applied to the MNIST model structure is improved by about 30%, as compared with the error rates of the comparative examples and the MNIST model structure. Note that although the error rate decreases by only 0.01% due to the merging process performed after the splitting process, the identification performance remains almost unchanged.

GTSRB

The GTSRB dataset is formed from images of German standard traffic signs including 39,209 training images in 43 different classes and 12,630 test images. Note that the sizes of the images in the GTSRB dataset are not the same and vary from 15×15 pixels to 250×250 pixels. If the images are directly used, the number of pixels per block used in training varies and, thus, the variation has an impact on recognition. Thus, according to the present example, the sizes of all the images of the GTSRB dataset are converted into a size of 48×48, and a pre-processing technique, such histogram smoothing processing or contrast normalizing processing, is applied to the images. Hereinafter, the GTSRB dataset subjected to the pre-processing is referred to as a "GTSRB dataset".

A model structure using the GTSRB dataset (a GTSRB1 model structure) is a convolutional neural network formed from three convolutional layers and two fully connected layers. In FIG. 13, an error rate of 2.44% is presented as the error rate serving as an identification performance value (a reference value) obtained when the GTSRB1 model structure trained using the training images of the GTSRB dataset identifies the test images of the GTSRB dataset.

FIG. 16 illustrates the error rates obtained when the splitting process or the merging process according to the present disclosure is applied to the GTSRB1 model structure. Note that in FIG. 16, "N" in "4N" indicates that the filter is split using the Gaussian noise, and "R" in "5R" indicates that the filter is split using rotational transformation. MERGE[No.] and SPLIT[No.] are the same as described above. As can be seen from FIG. 16, a fairly good performance is obtained in all of experiments in which the splitting process or the merging process according to the present disclosure is applied to the GTSRB1 model structure, or the performance that is the same as in a model having a much smaller size is obtained.

Figures 17, 18:
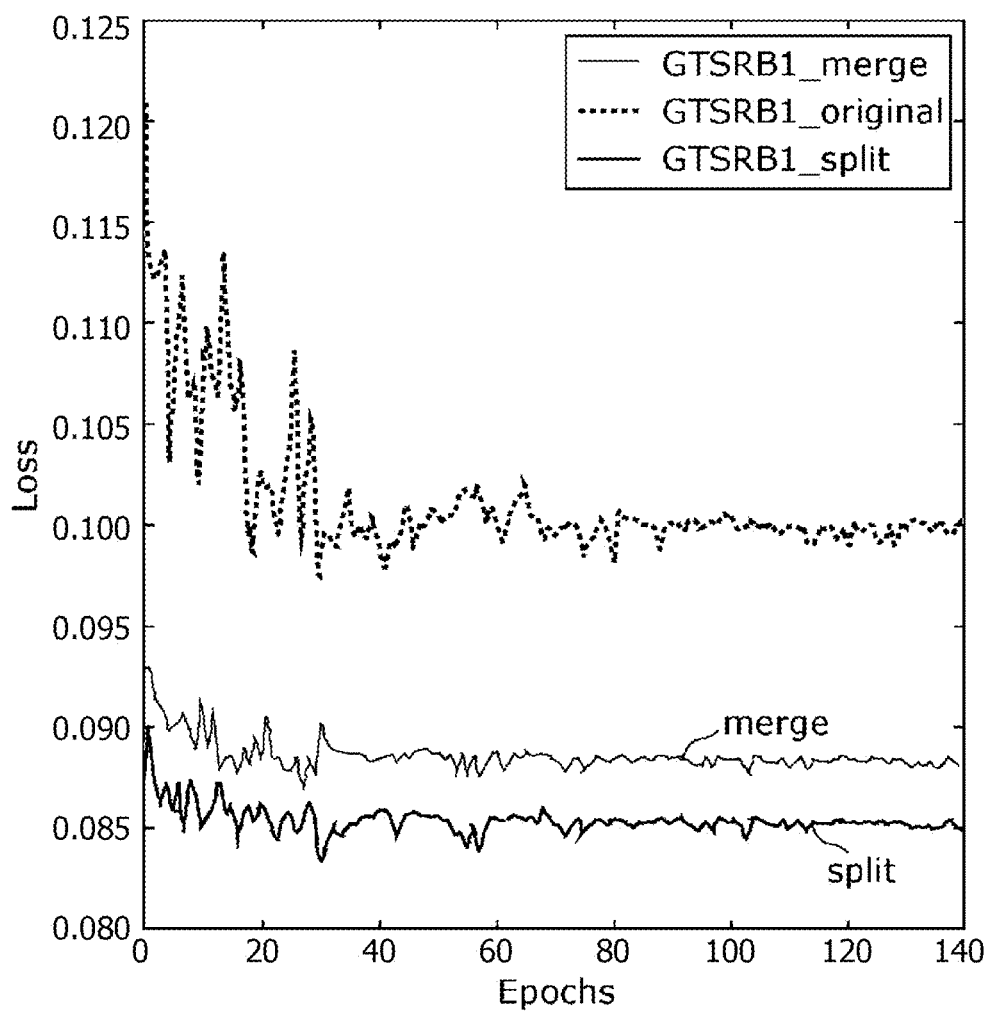
FIG. 17 illustrates the output value of an error function obtained when each of the GTSRB1 model structure and the GTSRB1 model structures subjected to the splitting process and the merging process according to the present disclosure is optimized.
FIG. 18 illustrates an example of a model structure using the GTSRB dataset.

FIG. 17 illustrates the output value of an error function obtained when each of the GTSRB1 model structure and the GTSRB1 model structures subjected to the splitting process and the merging process according to the present disclosure are optimized. In this case, GTSRB1_original and GTSRB1_merge having the same number of parameters are compared with each other. As can be seen from comparison in FIG. 17, the output value of the error function obtained when the GTSRB1 model structure subjected to the splitting process or the merging process according to the present disclosure is trained (optimized) using the training images of the GTSRB dataset is lower than the output value of the error function obtained when the GTSRB1 model structure is trained using the training images of the GTSRB dataset. That is, it can be seen that by performing the splitting process or the merging process according to the present disclosure, the structure of a convolutional neural network effective for image recognition is easily determined.

FIG. 18 illustrates an example of a model structure using the GTSRB dataset (the GTSRB-3DNN model structure).

The GTSRB-3DNN model structure is a convolutional neural network formed from three convolutional layers and two fully connected layers. The GTSRB-3DNN model structure is used by inputting images having different image sizes of 48×48 pixels, 38×48 pixels, and 28×48 pixels. Accordingly, the GTSRB-3DNN model structure is a model structure that is more collective than a GTSRB1 model structure having a simple model structure. In FIG. 13, an error rate of 1.24% is presented as the identification performance value (a reference value) obtained when the GTSRB-3DNN model structure trained using the training images of the GTSRB dataset identifies the test images of the GTSRB dataset.

FIG. 19 illustrates the error rate obtained when the splitting process or the merging process according to the present disclosure is applied to the GTSRB-3DNN model structure. As can be seen from FIG. 19, a fairly good performance is obtained in all of experiments in which the splitting process or the merging process according to the present disclosure is applied to the GTSRB-3DNN model structure, or the performance that is the same as in a model having a much smaller size is obtained.

CIFAR-10

The CIFAR-10 dataset includes 50,000 training images in 10 categories and 10,000 test images.

As a model structure using the CIFAR-10 dataset (the CIFAR-10 model structure), a convolutional neural network formed from three convolutional layers described in the above-mentioned non-patent literature "Network In Network" is used. In FIG. 13, an error rate of 10.4% is presented as the identification performance value (a reference value) obtained when the CIFAR-10 model structure trained using the training images of the CIFAR-10 dataset identifies the test images of the CIFAR-10 dataset.

FIG. 20 illustrates the error rate obtained when the splitting process or the merging process according to the present disclosure is applied to the CIFAR-10 model structure.

As can be seen from FIG. 20, the performance is improved or the same performance is obtained in all the experiments in which the splitting process or the merging process according to the present disclosure is performed on the filters that constitute the convolutional layer of the CIFAR-10 model structure (ORIGINAL). That is, it can be seen that application of the splitting process or the merging process according to the present disclosure is effective even when the splitting process or the merging process according to the present disclosure is applied to the structure of a complex and highly accurately tuned convolutional neural network, such as the convolutional neural network described in the above non-patent literature "Network In Network".

EXAMPLE 3

The effectiveness of the merging process according to the present disclosure is verified from the viewpoint of identification calculation time. Description of the effectiveness is described below as EXAMPLE 3.

FIG. 21 illustrates comparison of identification calculation times required when the merging process according to the present disclosure is performed.

A first line in FIG. 21 presents the calculation time 14.8 ms which is required when 10 images each having a size of 48×48 pixels are identified using the GTSRB1 model structure trained using the training images of the GTSRB dataset (ORIGINAL). In addition, second and third lines in FIG. 21 present the calculation times 14.1 ms and 12.6 ms which are required when 10 images each having a size of 48×48 pixels are identified using the GTSRB1 model structure to which the merging process is applied once or twice and which is trained using the training images of the GTSRB dataset (MERGE[1] and MERGE[2]), respectively.

In addition, a fourth line in FIG. 21 presents the calculation time 27.9 ms which is required when 10 images each having a size of 48×48 pixels are identified using the GTSRB-3DNN model structure trained using the training images of the GTSRB dataset (ORIGINAL). Furthermore, a fifth line in FIG. 21 presents the calculation time 19.4 ms which is required when 10 images each having a size of 48×48 pixels are identified using the GTSRB-3DNN model structure to which the merging process of the present disclosure is applied and which is trained using the training images of the GTSRB dataset (MERGE[4]).

As described above, it can be seen that the identification calculation time is improved in all the experiments in which the merging process according to the present disclosure is performed.

Effects and Others

As described above, according to the determination apparatus 10 and the determination method for use in the determination apparatus 10 of the present exemplary embodiment, the structure of a convolutional neural network can be determined more easily (or automatically). More specifically, according to the determination apparatus 10 and the determination method for use in the determination apparatus 10 of the present exemplary embodiment, by repeating the splitting process and the merging process using filters that constitute at least one of the convolutional neural network trained by Deep Learning as the initial values, the structure of a convolutional neural network effective for image recognition can be easily or automatically determined.

Note that the splitting process is a process to increase the number of filters that seem to be effective for image recognition by converting effective filters, and the merging process is a process to merge redundant filters through clustering and leave only effective filters. The transformation used in the splitting process can be selected from among image transformations (a transformation set) already known in image processing fields. Rotational transformation using a randomly determined angle and addition of Gaussian noise with a randomly determined standard deviation may be selected for the transformation, since consistent improvement can be expected. As the clustering method for use in the merging process, an existing clustering method, such as k-means clustering or Affinity propagation clustering, can be employed.

In this manner, even non-experts can obtain and use the structure of a convolutional neural network effective for image recognition by using the determination apparatus 10 and the determination method for use in the determination apparatus 10.

Note that while the determination apparatus 10 and others according to the present exemplary embodiment have been described with reference to the splitting process and the determination process performed, at least one of the splitting process and the determination process may be performed. In addition, the order in which the determination process and the determination process are performed and the number of performances of the splitting process and the determination process are not limited to those described in the above examples, and the user of the determination apparatus 10 may freely determine the order and the number of performances.

In addition, if a plurality of convolutional layers serving as the initial values are included in a convolutional neural network, the determination apparatus 10 and others according to the present exemplary embodiment may perform at least one of the splitting process and the determination process on the plurality of filters that constitute at least one convolutional layer. Furthermore, after at least one of the splitting process and the determination process is performed on the plurality of filters that constitute the one of the convolutional layers, at least one of the splitting process and the determination process may be performed on the plurality of filters that constitute a convolutional layer that differs from the one of the convolutional layers. That is, the determination apparatus 10 and others according to the present exemplary embodiment may perform at least one of the splitting process and the determination process on some or all of the filters of the convolutional neural network which serve as initial values.

While the determination method according to the present disclosure has been described with reference to the exemplary embodiment, the main units and apparatuses that perform the processes are not limited to any particular ones. The processes may be performed by, for example, a processor embedded in a particular apparatus locally located (described in detail below). Alternatively, the processes may be performed by a cloud server located in a place that differs from that of the local apparatus.

Note that the present disclosure further includes the cases described below.

(1) More specifically, each of the above-described units is a computer system including a microprocessor, a ROM, a RAM, a hard disk unit, a display unit, a keyboard, and a mouse. The RAM or the hard disk unit stores a computer program. By causing the microprocessor to operate in accordance with the computer program, each of the units achieves its function. Note that the computer program is formed by combining a plurality of instruction codes each serving as a command for a computer.

(2) Some or all of the constituent elements that constitute each of the above-described units may be formed from a single system large scale integration (system LSI). The system LSI is a super multifunctional LSI produced by integrating a plurality of constituent units into one chip. More specifically, the system LSI is a computer system including, for example, a microprocessor, a ROM, and a RAM. The RAM has a computer program stored therein. The microprocessor operates in accordance with the computer program and, thus, the system LSI realizes the function.

(3) Some or all of the constituent elements that constitute each of the above-described units may be formed from an IC card or a single module removable from the unit. The IC card or the module is a computer system formed from, for example, a microprocessor, a ROM, and a RAM. The IC card or the module may include the above-described super multifunctional LSI. When the microprocessor operates in accordance with the computer program, the IC card or the module provides its function. The IC card or the module may be tamper resistant.

(4) The present disclosure may be the above-described methods. Alternatively, the present disclosure may be a computer program that realizes the methods by using a computer or a digital signal formed from the computer program.

(5) Alternatively, the present disclosure may be the computer program or the digital signal recorded in a computer-readable storage medium, such as a flexible disk, a hard disk, a CD-ROM, an MO, a DVD, a DVD-ROM, a DVD-RAM, a BD (Blu-ray (registered trademark) Disc), or a semiconductor memory. In addition, the present disclosure may be the above-described digital signal recorded in such a storage medium.

Alternatively, the present disclosure may be the computer program or the digital signal transmitted via, for example, an electric communication network, a wireless or wired communication network, a network represented by the Internet, or data broadcasting.

Alternatively, the present disclosure may be a computer system including a microprocessor and a memory. The memory may store the above-described computer program therein, and the microprocessor may operate in accordance with the computer program.

Still alternatively, the present disclosure may be realized by another independent computer system by recording the program or the digital signal in the storage medium and transferring the storage medium or transferring the program or the digital signal via, for example, the above-mentioned network.

(6) The above-described exemplary embodiment and the modifications thereof may be combined in any way.

The present disclosure can be employed for a determination apparatus and a determination method that determine the structure of a convolutional neural network effective for recognition. In particular, the present disclosure can be employed for a determination apparatus and a determination method that determine the structure of a convolutional neural network that is effective for image recognition and that can operate even in an embedded system having computing power lower than that of a personal computer system.

What is claimed is:

1. A determination method for determining a structure of a convolutional neural network, the determination method comprising:
    acquiring N filters having weights trained using a training image group as initial values, where N is a natural number greater than or equal to 1; and
    splitting at least one of the N filters to increase a number of filters from N to M and to acquire M filters, where M is a natural number greater than or equal to 2 and is greater than N,
    wherein the splitting adds at least one filter by performing a transformation used in image processing fields on each of the at least one of the N filters.

2. The determination method according to claim 1, further comprising:
    evaluating an identification performance of the M filters by causing the M filters to learn the weights by using the training image group,
    wherein, if the identification performance of the M filters is less than or equal to an identification performance of the N filters, splitting at least one of the M filters.

3. The determination method according to claim 1, further comprising:
    merging the M filters into L filters, where L is a natural number greater than or equal to 1 and is less than M, by clustering the M filters and selecting a filter located at a center of each cluster.

4. The determination method according to claim 3, wherein, in the merging, the M filters are clustered into L clusters by using k-means clustering.

5. The determination method according to claim 3, wherein, in the merging, the M filters are clustered by using Affinity propagation clustering.

6. The determination method according to claim 1, wherein the transformation includes a rotational transformation using a randomly determined angle, and
    the splitting adds the at least one filter by performing the rotational transformation on the at least one of the N filters.

7. The determination method according to claim 1, wherein the transformation includes an addition of Gaussian noise with randomly determined standard deviation, and
    the splitting adds the at least one filter by performing the addition of Gaussian noise on the at least one of the N filters.

8. The determination method according claim 1, wherein the transformation includes a contrast transformation for obtaining a randomly determined contrast ratio, and
the splitting adds the at least one filter by performing the contrast transformation on the at least one of the N filters.

9. The determination method according to claim 1, wherein the transformation includes a scale transformation for obtaining a randomly determined scale, and
the splitting adds the at least one filter by performing the scale transformation on the at least one of the N filters.

10. A determination method for determining a structure of a convolutional neural network, the determination method comprising:
acquiring M filters having weights trained using a training image group as initial values, where M is a natural number greater than or equal to 2; and
merging the M filters into L filters, where L is a natural number greater than or equal to 1 and is less than M, by clustering the M filters and selecting a filter located at a center of each cluster.

11. A non-transitory computer-readable recording medium storing a program, the program causing a computer to execute a process that includes:
acquiring N filters having weights trained using a training image group as initial values, where N is a natural number greater than or equal to 1; and
splitting at least one of the N filters to increase a number of filters from N to M and to acquire M filters, where M is a natural number greater than or equal to 2 and is greater than N,
wherein the splitting adds at least one filter by performing a transformation used in image processing fields on each of the at least one of the N filters.

12. The determination method according claim 10, wherein the M filters are merged into L clusters, with the filter located at a center of each of the L clusters being selected to define the L filters, in order to prevent overlearning.

13. The determination method according claim 10, wherein the M filters are merged into L clusters, and
the determination method further comprises:
calculating a center of mass for each of the L clusters, with the filter being closest to the center of mass for each of the L clusters being selected to define the L filters.

* * * * *